Figure 1:
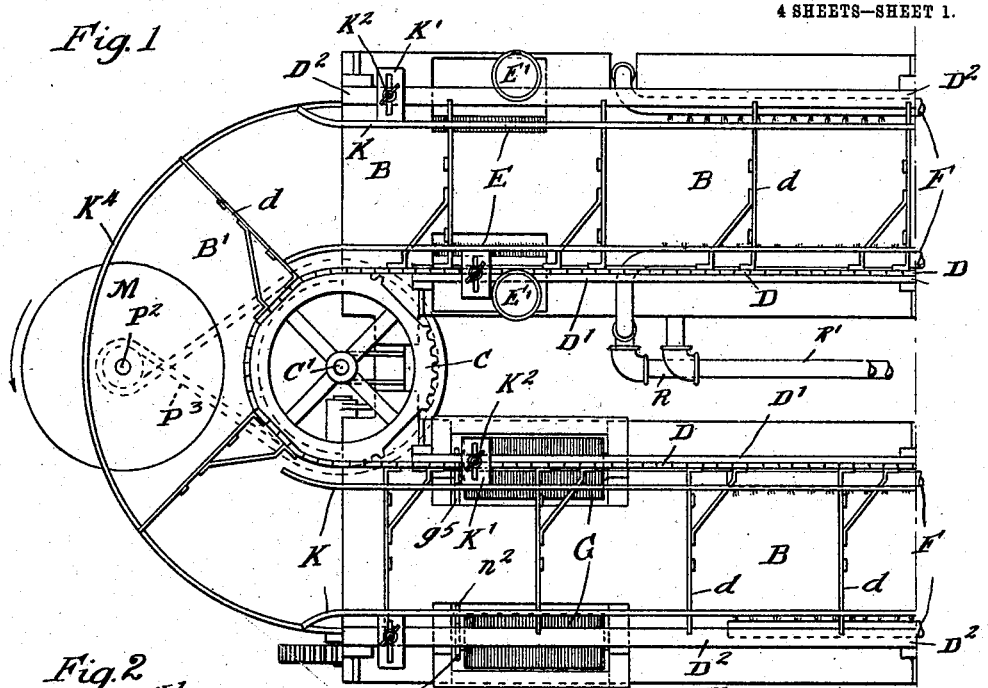

F. EBERHART.
MACHINE FOR FUSING OR SOLDERING HEADS UPON SQUARE OR RECTANGULAR CANS.
APPLICATION FILED AUG. 20, 1906.

905,300.

Patented Dec. 1, 1908.
4 SHEETS—SHEET 1.

Witnesses:
Wm Geiger
H. M. Munday

Inventor
Felix Eberhart.
By Munday, Evarts, Adcock & Clarke.
Attorneys

F. EBERHART.
MACHINE FOR FUSING OR SOLDERING HEADS UPON SQUARE OR RECTANGULAR CANS.
APPLICATION FILED AUG. 20, 1906.
905,300.
Patented Dec. 1, 1908.
4 SHEETS—SHEET 2.
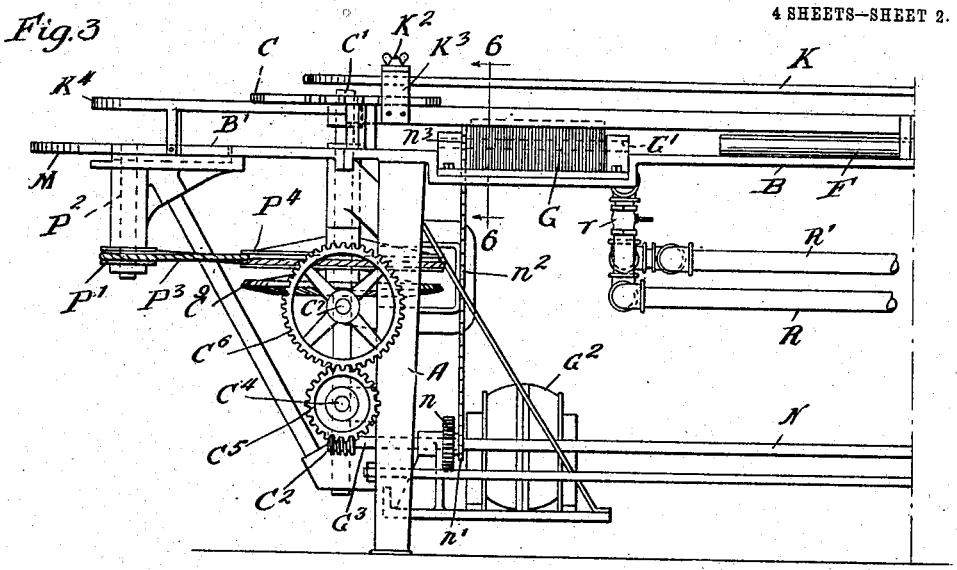
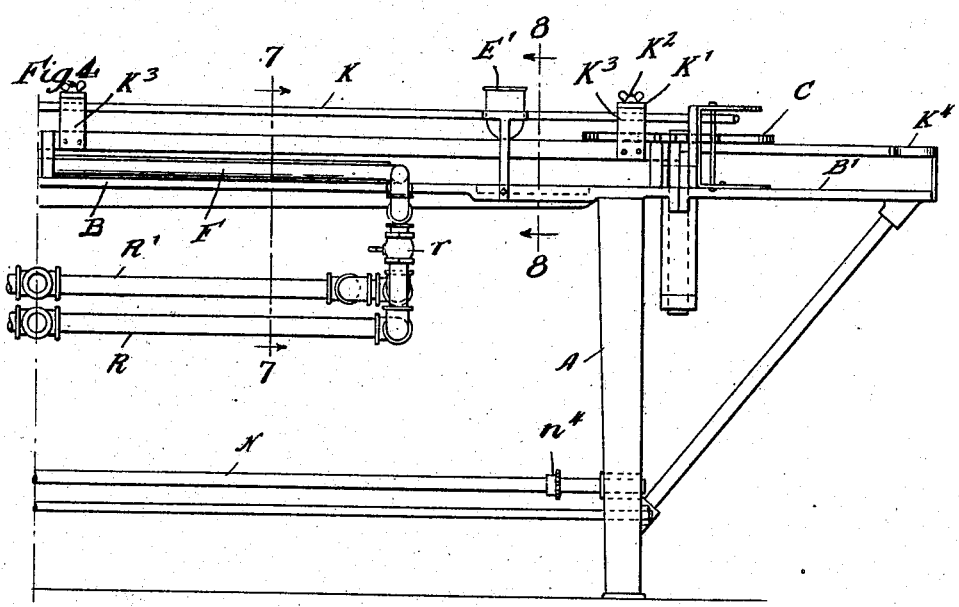
Witnesses:
Wm. Geiger
H. W. Munday
Inventor
Felix Eberhart.
By Munday, Evarts, Adcock & Clarke
Attorneys F. EBERHART.
MACHINE FOR FUSING OR SOLDERING HEADS UPON SQUARE OR RECTANGULAR CANS.
APPLICATION FILED AUG. 20, 1906.

905,300.

Patented Dec. 1, 1908.
4 SHEETS—SHEET 3.

Witnesses
Wm. Geiger
H. W. Munday

Inventor
Felix Eberhart.
By Munday, Evarts, Adcock & Clarke,
Attorneys

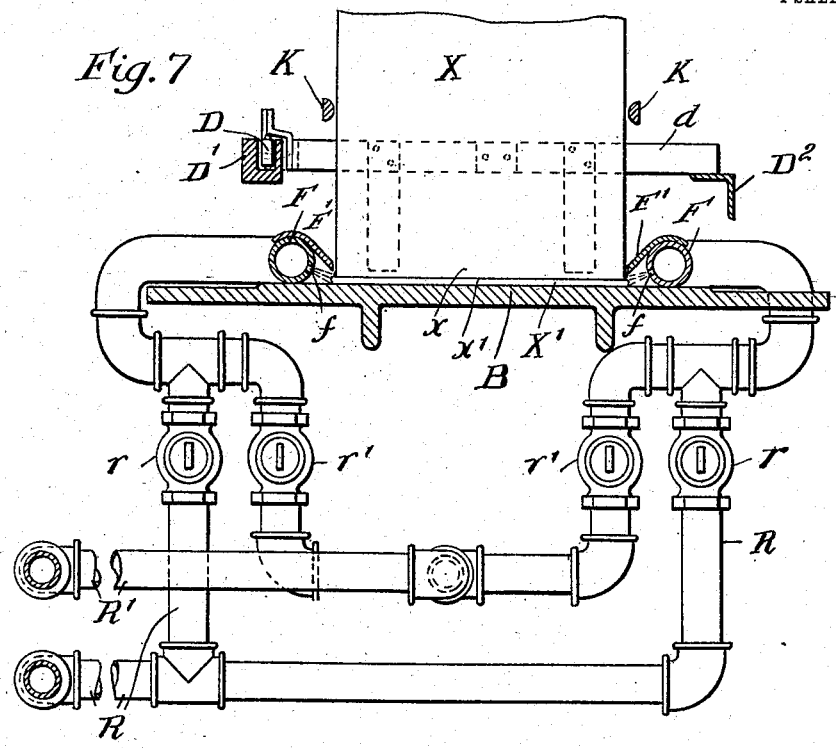
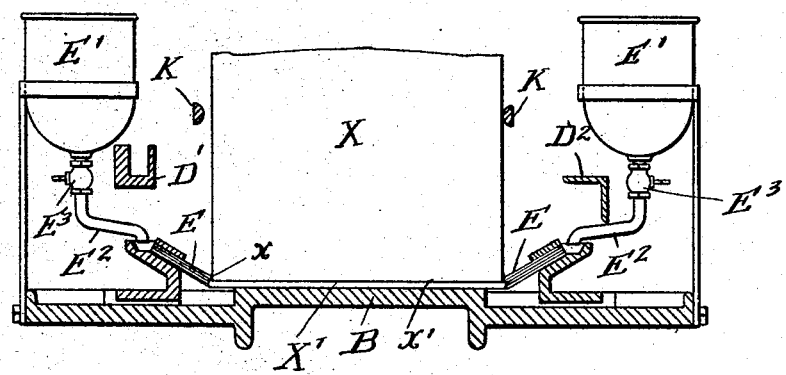

UNITED STATES PATENT OFFICE.

FELIX EBERHART, OF NEW YORK, N. Y., ASSIGNOR TO AMERICAN CAN COMPANY, OF NEW YORK, N. Y., A CORPORATION OF NEW JERSEY.

MACHINE FOR FUSING OR SOLDERING HEADS UPON SQUARE OR RECTANGULAR CANS.

No. 905,300.     Specification of Letters Patent.     Patented Dec. 1, 1908.

Application filed August 20, 1906. Serial No. 331,237.

*To all whom it may concern:*

Be it known that I, FELIX EBERHART, a citizen of the United States, residing in New York, in the county of New York and State of New York, have invented a new and useful Improvement in Machines for Fusing or Soldering Heads Upon Square or Rectangular Cans, of which the following is a specification.

My invention relates to improvements in machines for soldering the heads upon square or rectangular cans by fusing solder ribs or beads previously applied to the can bodies near the ends thereof.

The object of my invention is to provide a can fusing machine of a simple, efficient and durable construction, by means of which square or rectangular cans may be rapidly, cheaply and perfectly soldered by fusing solder previously applied to the can bodies near the ends thereof, and by which the solder coated exterior surface of the can body and can head adjacent to the soldered joint may be wiped clean of solder and polished so as to restore the original tin luster and give the cans a neat appearance.

My invention consists in the means I employ for practically accomplishing this object or result; that is to say it consists, in connection with a can supporting plate or track along which the cans are moved in an upright position with the head to be soldered lowermost and resting flat upon such track or plate, of heater pipes above, parallel and adjacent to said track for projecting gas or other flame against the cans as they are moved along said track, a conveyer or chain having a series of can pusher arms for moving the cans along said track, an aciding or fluxing device for applying acid or other flux to the cans as they are moved along said track before reaching the can heating pipes, rotary cylindrical wipers arranged above and parallel to said track for removing from the exterior surface of the can body and can head adjacent to the solder joint, the surplus solder and polishing such surface to restore its original tin luster, and a rotary can turning disk arranged in said can track, flush therewith, for giving the cans a quarter or partial turn after the two opposite sides thereof have been soldered preparatory to soldering the two remaining sides thereof.

My invention also consists in the novel construction of parts and devices and in the novel combinations of parts and devices herein shown and described, and more particularly pointed out in the claims.

Figure 2:
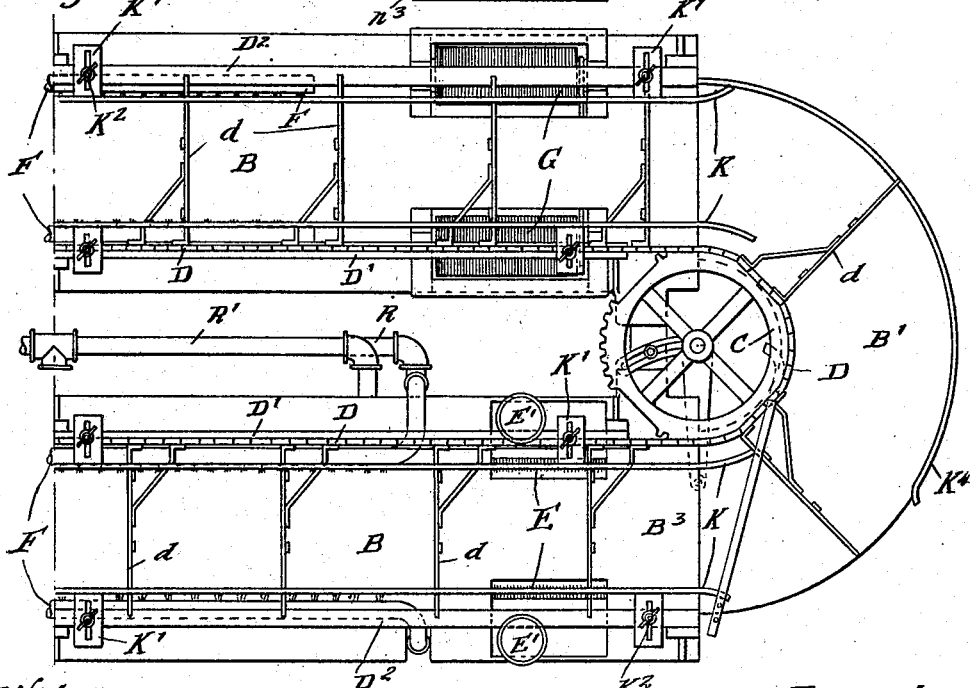
Figure 5:
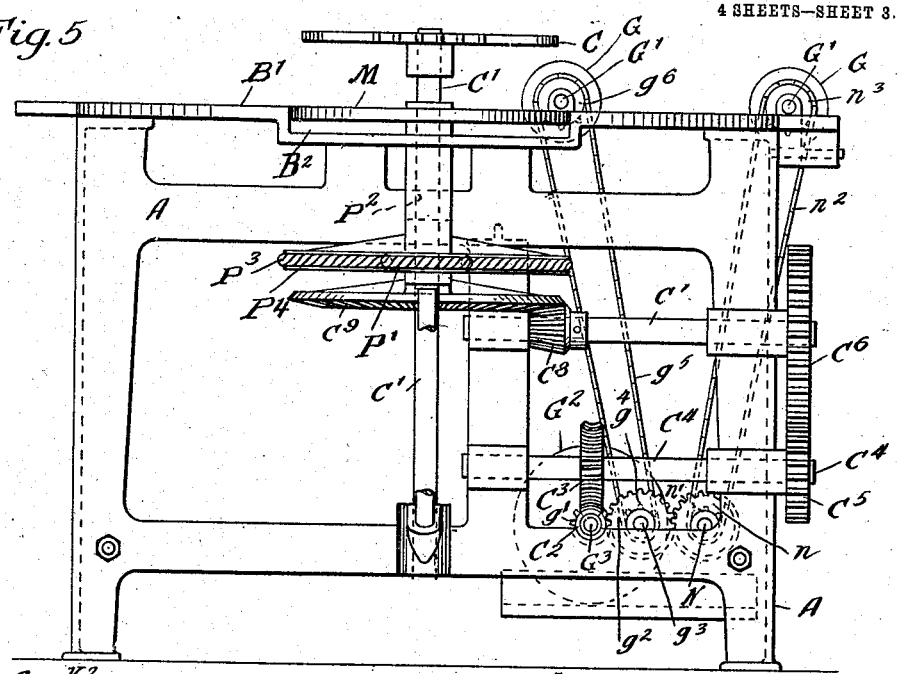
Figure 6:
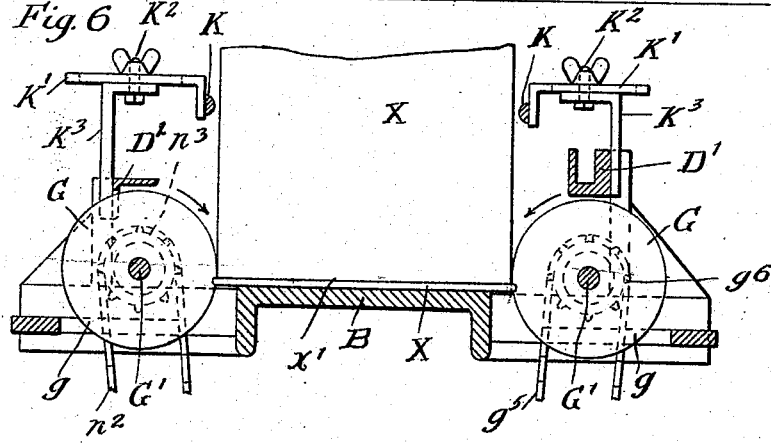

In the accompanying drawing, forming a part of this specification, Figures 1 and 2, taken together, are a plan view of a fusing machine embodying my invention; Figs. 3 and 4, taken together, are a side elevation; Fig. 5 is an end view; Fig. 6 is a detail vertical section on line 6—6 of Fig. 3; Fig. 7 is a detail vertical section on line 7—7 of Fig. 4, and Fig. 8 is a detail vertical section on line 8—8 of Fig. 4.

In the drawing A represents the frame of the machine, B is the can supporting plate or track along which the cans are moved, the same being of an endless or loop form and having curved portions $B^1$ at each end.

C and C are the pulleys or sprocket wheels. The can conveyer chain D travels upon a supporting track $D^1$ $D^2$, and is furnished with a series of can pusher arms $d$ projecting horizontally and operating to push the cans along the track B.

E E are acid or flux applying devices, preferably brushes, arranged parallel to the can track B and adjacent thereto, the flux being preferably supplied to the brushes from the tanks $E^1$ through the connecting pipes $E^2$ which are furnished with valves $E^3$ to regulate the flow.

F F are the heater pipes having jets or orifices $f$ for projecting gas or other flame against the cans as they are moved along the track B by the conveyer D so as to heat the joint to be soldered and fuse the bead or rib of solder $x$ on the can bodies X just above the edge of the flange $x^1$ of the can head $X^1$.

G G are long cylindrical rotary brushes or buffers arranged parallel and adjacent to the path of the cans to wipe or remove the surplus solder from the exterior surface of the can body and can head flange adjacent to the soldered joint and to polish the tin plate and restore it to its original tin luster. These brushes or buffers are preferably composed of a series of soft, flexible circular cloth disks $g$ strung and clamped upon the buffer shafts $G^1$, and the rotary cylindrical buffers are rotated at a high or buffing speed. The rotary buffers are preferably thus operated by an electric motor $G^2$, the shaft $G^3$ of which is furnished with a gear $g^1$ meshing with a gear $g^2$ on a stud shaft $g^3$.

On the shaft $g^3$ is a sprocket wheel $g^4$ carrying a chain $g^5$ which communicates power to one buffer shaft $G^1$, said buffer shaft carrying a sprocket wheel $g^6$. The gear $g^2$ meshes with a gear $n$ on the shaft N, said shaft carrying a sprocket wheel $n^1$ and a chain $n^2$ which communicates power to the other buffer shaft $G^1$, said shaft carrying a sprocket wheel $n^3$. The shaft N carries another sprocket wheel $n^4$ which communicates power to the other buffer shaft $G^1$ in a similar manner.

K K are adjustable guides between which the cans pass as they are conveyed along over the track B by the conveyer D. These guides K K may be adjusted closer together or farther apart to accommodate cans of different sizes by the slotted adjusting arms $K^1$ and clamp screws $K^2$ by which said guides are connected to their supporting brackets $K^3$.

M is a rotary can turning disk or circular plate mounted preferably in a recess $B^2$ in the curved portion $B^1$ of the can track B and flush with the upper surface thereof, by means of which, in coöperation with the arms $d$ of the conveyer D and curved can guide $K^4$, the cans are given a quarter turn after having two of the sides thereof fused and soldered preparatory to the fusing and soldering of the remaining two sides thereof by the other side or half of the machine.

Motion is communicated from the motor shaft $G^3$ to the shaft $C^1$ of the sprocket wheel C by means of a worm $C^2$ on the motor shaft which meshes with a worm gear $C^3$ on the shaft $C^4$, which has a gear $C^5$ meshing with a gear $C^6$ on the shaft $C^7$ which has a bevel gear $C^8$, meshing with a gear $C^9$ on the shaft $C^1$ of the sprocket wheel C. The rotary can turning disk or plate M is driven by a pulley $P^1$ on its shaft $P^2$ through a belt $P^3$ which engages a pulley $P^4$ on the shaft of the can conveyer pulley or sprocket wheel $C^1$.

R is the gas supply pipe and $R^1$ an air blast pipe for supplying gas and compressed air to the burner pipes F, the same being provided with suitable regulating valves $r$ $r^1$. The burner or heater pipes F are furnished with asbestos or other non-conducting shields $F^1$ for deflecting and directing the flame from the jets or burners $f$ properly against the cans.

In operation the cans are placed on the can track B at $B^3$ in position to be engaged by the can pusher arms $d$ of the conveyer D, and are thus moved between the can guides K K along the track B, first past the fluxing devices E, then along and between the burner or heater pipes F, thus fusing the solder previously applied to the can body and causing the solder to flow down into the seam and form the joint, and then past and between the rotary wipers or buffers G G by which the surplus solder is removed from the exterior surface of the can body and can head while it is yet molten and by which the solder coated surface is polished and restored to its original tin luster. The cans then move further along the track B onto the rotary can turning plate M by which the cans are given a quarter turn before again entering between the can guards K K on the remaining half of the machine, preparatory to fusing and soldering the remaining two sides of the can, if the can is square in horizontal section the can guides K K on both sides of the machine and the heater pipes and other parts may be arranged the same distance apart, as illustrated in the drawing; but if the cans are greater in one horizontal direction than the other, the can guides K K and other parts, will be correspondingly adjusted on one side of the machine.

I claim:

1. In a can fusing machine, the combination with a track for the cans, a conveyer for sliding the cans along the track, heater pipes parallel to the track between which the cans are conveyed, and rotary wipers parallel to the track between which the cans are conveyed, substantially as specified.

2. In a can fusing machine, the combination with a track for the cans, a conveyer for moving the cans along the track, heater pipes parallel to the track between which the cans are conveyed, rotary buffers parallel to the track between which the cans are conveyed, and guides for the cans parallel to the track, substantially as specified.

3. In a can fusing machine, the combination with a track for the cans of a loop form, an endless flexible conveyer for moving the cans along the track, gas burner pipes parallel to the track and between which the cans are conveyed on each side of the machine, and a rotary can turning disk at the curved or loop portion of the track for giving the cans a quarter turn, substantially as specified.

4. In a can fusing machine, the combination with a track for the cans of an endless form, an endless flexible conveyer for moving the cans along the track, gas burner pipes parallel to the track and between which the cans are conveyed on each side of the machine, a rotary can turning disk at the curved or loop portion of the track for giving the cans a quarter turn, and two pair of fluxing devices parallel to the track and between which the cans are conveyed, substantially as specified.

5. In a can fusing machine, the combination with a track for the cans of an endless form, an endless flexible conveyer for moving the cans along the track, gas burner pipes parallel to the track and between which the cans are conveyed on each side of the machine, a rotary can turning disk at the curved or loop portion of the track for giving the cans a quarter turn, two pair of fluxing devices parallel to the track and between which the cans are conveyed, and two pair of rotary cylindrical wipers or buffers parallel to said track and between which the cans pass, substantially as specified.

6. In a can fusing machine, the combination with a track for the cans, a conveyer for sliding the cans along the track, gas burner pipes parallel to the track and between which the cans are conveyed, and asbestos shields or deflectors for said gas burner or heater pipes, substantially as specified.

7. In a can fusing machine, the combination with a track for the cans, a conveyer for moving the cans along the track, gas burner pipes parallel to the track and between which the cans are conveyed, a pair of rotary cylindrical buffers parallel to the track and between which the cans are conveyed, and adjustable guides for the cans, substantially as specified.

8. In a can fusing machine, the combination with a track for the cans, a conveyer for moving the cans along the track, gas burner pipes parallel to the track and between which the cans are conveyed, a pair of rotary cylindrical buffers parallel to the track and between which the cans are conveyed, adjustable guides for the cans, means for driving said conveyer and means for rapidly rotating said cylindrical wipers or buffers, substantially as specified.

9. In a can fusing machine, the combination with an endless loop track for the cans, having two parallel straight portions, an endless flexible conveyer for moving the cans along said track, fluxing devices, gas burner pipes parallel to said track between which the cans are conveyed, means for giving the cans a quarter turn after passing one pair of said gas burner pipes, and two pair of rotary cylindrical buffers parallel to the can track and between which the cans pass, substantially as specified.

FELIX EBERHART.

Witnesses:
E. S. ROUNDS,
GEO. E. GADDIS.